US012742972B2

(12) United States Patent
Chao et al.

(10) Patent No.: US 12,742,972 B2
(45) Date of Patent: Sep. 22, 2026

(54) ROTATING SHAFT STRUCTURE FOR VIRTUAL REALITY OR AUGMENTED REALITY GLASSES, AND GLASSES

(71) Applicant: PEGATRON CORPORATION, Taipei City (TW)

(72) Inventors: Chi-Yao Chao, Taipei City (TW); Tsung-Yueh Yu, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 226 days.

(21) Appl. No.: 18/886,146

(22) Filed: Sep. 16, 2024

(65) Prior Publication Data

US 2025/0147326 A1 May 8, 2025

(30) Foreign Application Priority Data

Nov. 8, 2023 (TW) ................................ 112143116

(51) Int. Cl.
*G02B 27/01* (2006.01)
*G02C 5/22* (2006.01)

(52) U.S. Cl.
CPC ........... *G02B 27/0176* (2013.01); *G02C 5/22* (2013.01); *G02B 2027/0178* (2013.01)

(58) Field of Classification Search
CPC ........ G02C 5/22; G02C 5/2218; G02C 11/10; G02C 27/0176; G02C 2027/0154; G02C 2027/0178; G02C 2200/28
See application file for complete search history.

(56) References Cited

FOREIGN PATENT DOCUMENTS

| | | |
|---|---|---|
| CN | 205982872 U | 2/2017 |
| CN | 114721150 A | 7/2022 |

*Primary Examiner* — Jack Dinh
(74) *Attorney, Agent, or Firm* — MUNCY, GEISSLER, OLDS & LOWE, P.C.

(57) ABSTRACT

The present invention discloses a rotating shaft structure for virtual reality (VR) or augmented reality (AR) glasses, and glasses. The rotating shaft structure includes a first housing, a second housing, an annular frame, an elastic body, and a rotating shaft. The first housing has a guide groove, and the guide groove includes two retaining walls and a recess located between the retaining walls. The second housing is relatively rotatably fitted with the first housing, and at least part of the second housing is located within the first housing. The annular frame is rotatably arranged in the first housing, is engaged with the second housing, and has a positioning post extending toward the guide groove. Two ends of the elastic body are respectively connected to the first housing and the annular frame. The rotating shaft extends through the first housing, the elastic body, and the annular frame.

17 Claims, 8 Drawing Sheets

ROTATING SHAFT STRUCTURE FOR VIRTUAL REALITY OR AUGMENTED REALITY GLASSES, AND GLASSES

CROSS REFERENCE TO RELATED APPLICATIONS

This application claims the priority benefit of Taiwan application serial no. 112143116, filed on Nov. 8, 2023. The entirety of the above-mentioned patent application is hereby incorporated by reference herein and made a part of this specification.

BACKGROUND

Technical Field

The present invention relates to a rotating shaft structure and glasses, and in particular, to a rotating shaft structure for virtual reality (VR) or augmented reality (AR) glasses, and glasses.

Description of Related Art

Nowadays, with development and popularization of virtual reality (VR) or augmented reality (AR), head-mounted displays need to be designed in such a way that the head-mounted displays can be carried around by consumers. Therefore, glasses with a foldable and volume-reducible mechanism design are gradually introduced into the market.

Currently, the following three problems exist in the design of the VR or AR glasses. Firstly, since a specific holding force needs to be maintained to ensure stable wearing by a user, and functions of expanding and folding and storage are needed, during operations of expanding and folding of glass feet, the rotating shaft structure needs different damping designs and a free-stop function, to achieve normal wearing and storage operations. Secondly, the rotating shaft structure needs to provide a sufficient threading space to accommodate flexible flat cables (for example, a flexible printed circuit (FPC)), wires, or the like. Thirdly, problems that the flexible flat cables, the wires, or relevant electronic components are exposed or interfere with the mechanism need to be avoided when the rotating shaft structure does not rotate.

SUMMARY

The present invention is intended to provide a rotating shaft structure for virtual reality (VR) or augmented reality (AR) glasses, and glasses. The rotating shaft structure can enable operations which facilitate wearing and storage of the glasses, such as unfolding, expanding, and folding, while making the glasses practical and comfortable.

To achieve the above purposes, the present invention provides a rotating shaft structure for VR or AR glasses. The rotating shaft structure is configured to be connected to a glass frame and a glass foot, and includes a first housing, a second housing, an annular frame, an elastic body, and a rotating shaft. The first housing has a guide groove, and the guide groove includes two retaining walls and a recess located between the retaining walls. The second housing is relatively rotatably fitted with the first housing, and at least part of the second housing is located within the first housing. The annular frame is rotatably arranged in the first housing, and is engaged with the second housing. The annular frame has a positioning post extending toward the guide groove. The positioning post is arranged corresponding to the guide groove, and the positioning post is configured to abut against the guide groove and move relative to the guide groove. The elastic body is arranged in the first housing and the second housing, and two ends of the elastic body are respectively connected to the first housing and annular frame. The rotating shaft extends through the first housing, the elastic body, and the annular frame. When the first housing rotates relative to the second housing through the rotating shaft, the first housing further rotates relative to the annular frame, so that the positioning post moves relative to the guide groove and the positioning post selectively stops at the retaining walls or the recess.

In an embodiment, the second housing has an accommodation hole located within the first housing and overlapping the first housing in an extending direction of the rotating shaft. The elastic body, the annular frame, and the guide groove are located within the accommodation hole.

In an embodiment, the first housing further has a fixing portion facing the annular frame. The guide groove is located on a periphery of the fixing portion.

In an embodiment, the rotating shaft extends through the accommodation hole, and an end of the rotating shaft is fixed to the fixing portion.

In an embodiment, two guide grooves are arranged, and the guide grooves are respectively located on two opposite sides of the periphery of the fixing portion.

In an embodiment, the annular frame further has an annular body. Two positioning posts are arranged, and the positioning posts are respectively located on two opposite sides of the annular body and arranged corresponding to the guide grooves.

In an embodiment, a first accommodation space exists between the first housing and a side wall of the accommodation hole. The second housing further has a second accommodation space in communication with the first accommodation space. The first accommodation space and the second accommodation space are configured for a flexible flat cable of the glasses to extend through.

In an embodiment, the second housing has a side wall. The side wall includes an engagement groove fitted with the positioning post. The engagement groove is in communication with the accommodation hole. A side surface of the positioning post is engaged with the engagement groove.

In an embodiment, when the first housing rotates and the second housing rotate relative to each other, the annular frame moves in an extending direction parallel to the rotating shaft through the positioning post and the guide groove.

In an embodiment, the guide groove includes a folding area, an unfolding area, and an expanding area. The unfolding area is located between the folding area and the expanding area, to form different angles between the glass frame and the glass foot based on a position on the guide groove at which the positioning post stops.

In an embodiment, when the positioning post moves to the unfolding area relative to the guide groove, the positioning post is engaged with the recess.

In an embodiment, the retaining walls include a folding retaining wall. A space between the folding retaining wall and the recess is defined as the folding area. A step exists between the folding area and the recess.

In an embodiment, the retaining walls include an expanding retaining wall. A space between the expanding retaining wall and the recess is defined as the expanding area. The expanding area includes an inclined plane.

In an embodiment, when the positioning post moves to the expanding area relative to the guide groove and applies no force to the first housing or the second housing, the positioning post of the annular frame moves to the unfolding area through the elastic body relative to the guide groove along the inclined plane.

To achieve the above purposes, the present invention further provides VR or AR glasses. The glasses include a glass frame, a glass foot, and the above rotating shaft structure. The rotating shaft structure is arranged between the glass frame and the glass foot, and the glass frame and the glass foot are configured to rotate relative to each other through the rotating shaft structure.

In an embodiment, the first housing of the rotating shaft structure is connected to the glass frame, and the second housing of the rotating shaft structure is connected to the glass foot.

In an embodiment, the first housing of the rotating shaft structure is connected to the glass foot, and the second housing of the rotating shaft structure is connected to the glass frame.

Based on the above, in the rotating shaft structure for VR or AR glasses and the glasses of the present invention, the guide groove of the first housing includes the two retaining walls and the recess located between the retaining walls; the annular frame is rotatably arranged in the first housing, is engaged with the second housing, and has the positioning post extending toward the guide groove, and the positioning post can abut against the guide groove and move relative to the guide groove; the two ends of the elastic body are respectively connected to the first housing and the annular frame; the rotating shaft extends through the first housing, the elastic body, and the annular frame; and when the first housing rotates relative to the second housing through the rotating shaft, the first housing further rotates relative to the annular frame, so that the positioning post moves relative to the guide groove and the positioning post selectively stops at the retaining walls or the recess. Through the above structural design, the rotating shaft structure can enable operations which facilitate wearing and storage of the glasses of the present invention, such as unfolding, expanding, and folding, while making the glasses practical and comfortable.

In an embodiment of the present invention, the accommodation space that can accommodate the flexible flat cable (or the wire) of the glasses is further designed between the housings of the rotating shaft structure, so that problems that the relevant components such as the flexible flat cable (or the wire) are exposed or interfere with the mechanism are avoided, to achieve functions needed during practical use of head-mounted displays.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION

Figure 1:
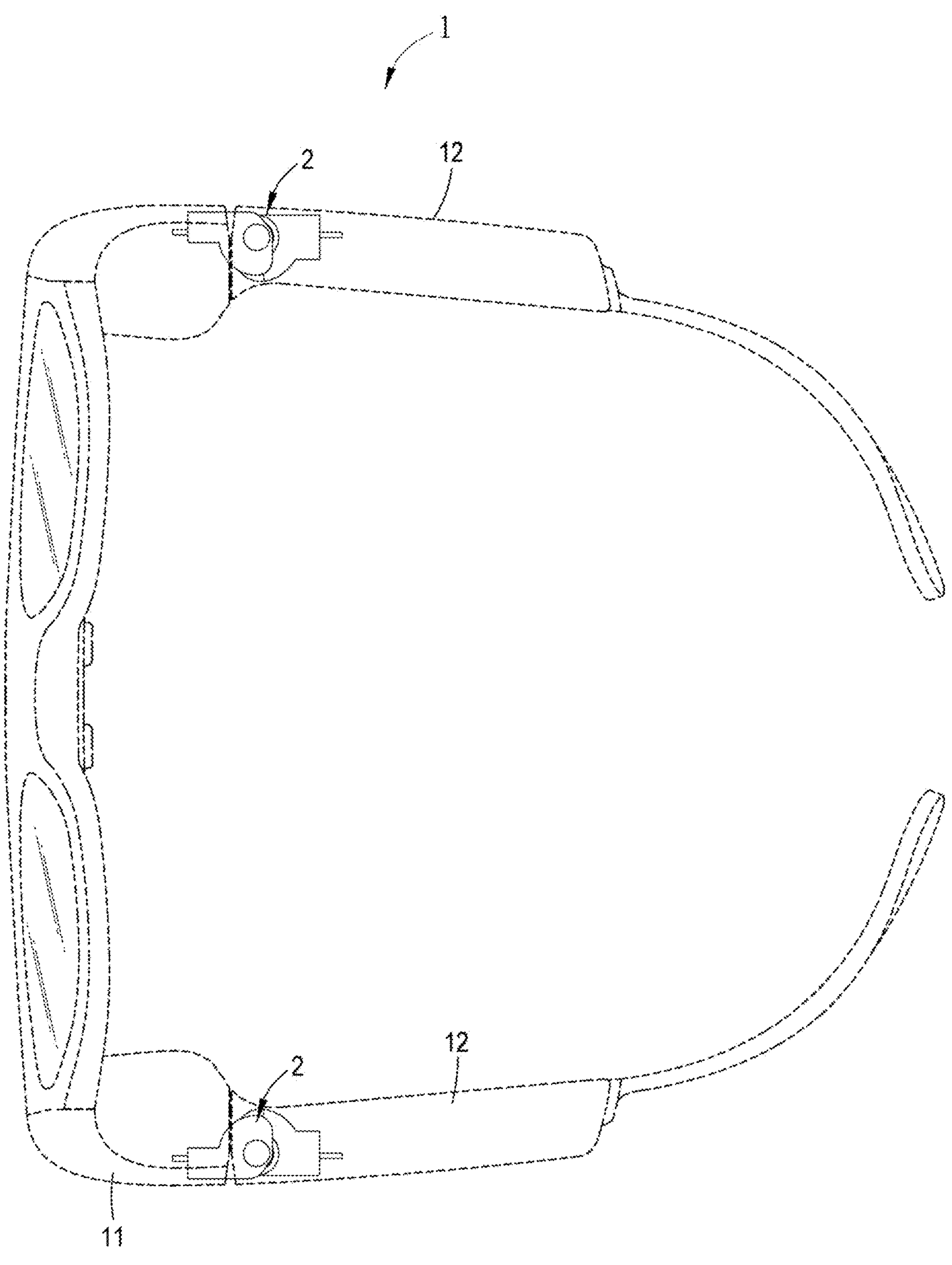
FIG. 1 is a schematic top view of virtual reality (VR) or augmented reality (AR) glasses according to an embodiment of the present invention.

Virtual reality (VR) or augmented reality (AR) glasses in embodiments of the present invention are described below with reference to relevant drawings. Same elements are described with same reference numerals. Elements in the following embodiments are merely used for describing relative relationships thereof, and do not represent a proportion or a size of a real element.

Figure 2A:
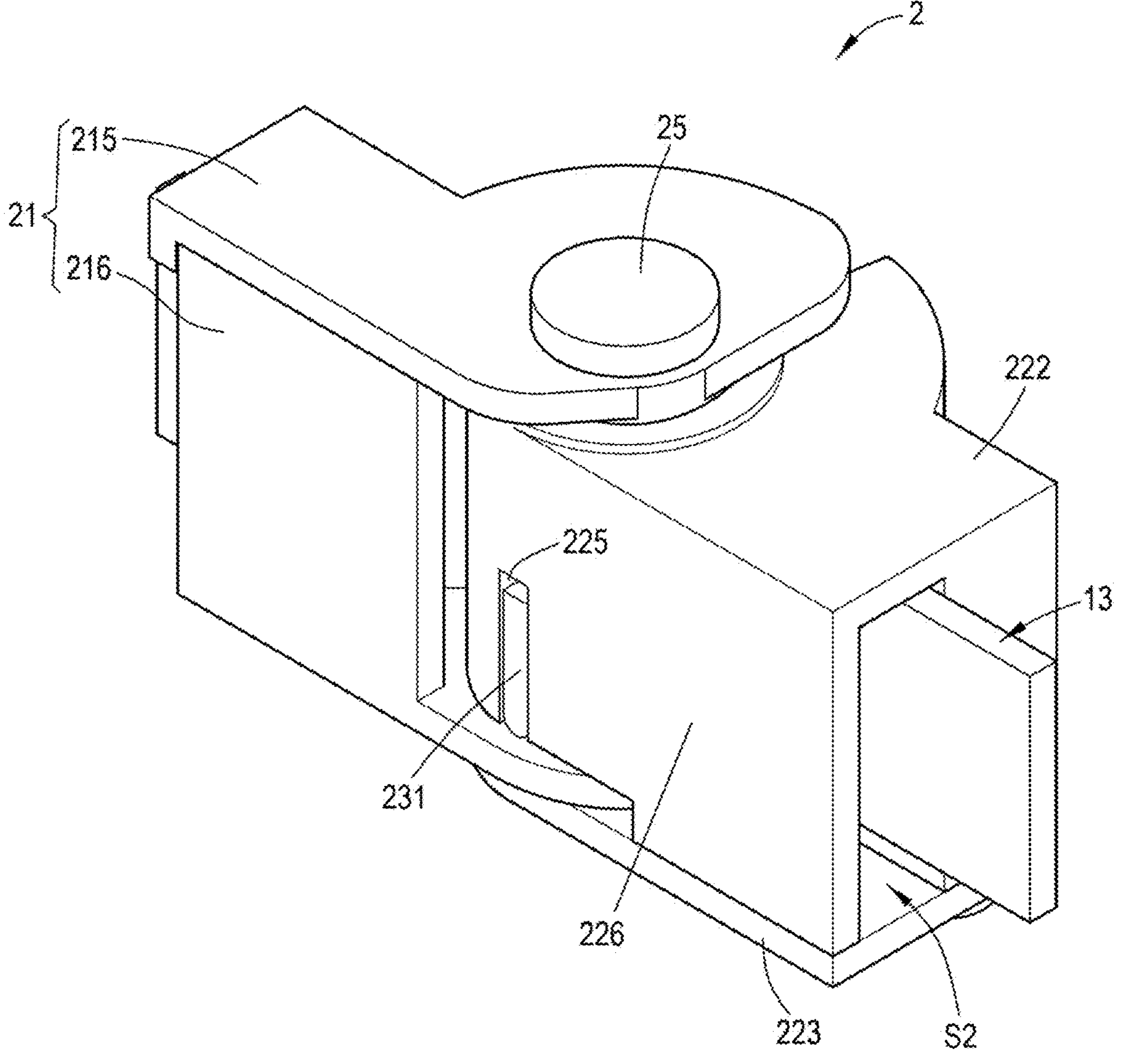
FIG. 2A and FIG. 2B are respectively a three-dimensional schematic diagram and a schematic exploded view of a rotating shaft structure of the glasses in FIG. 1.
Figure 2B:
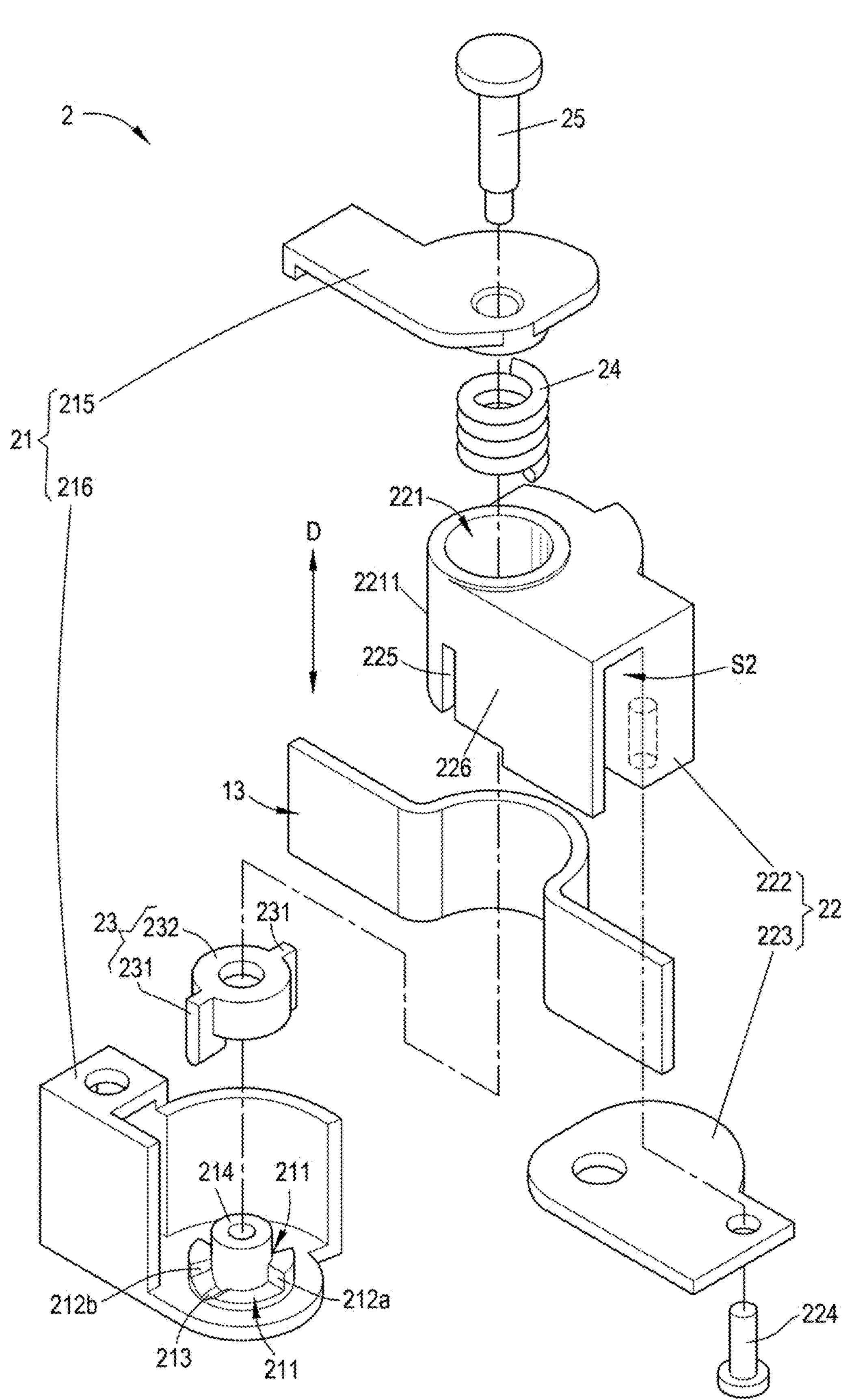
Figure 3:
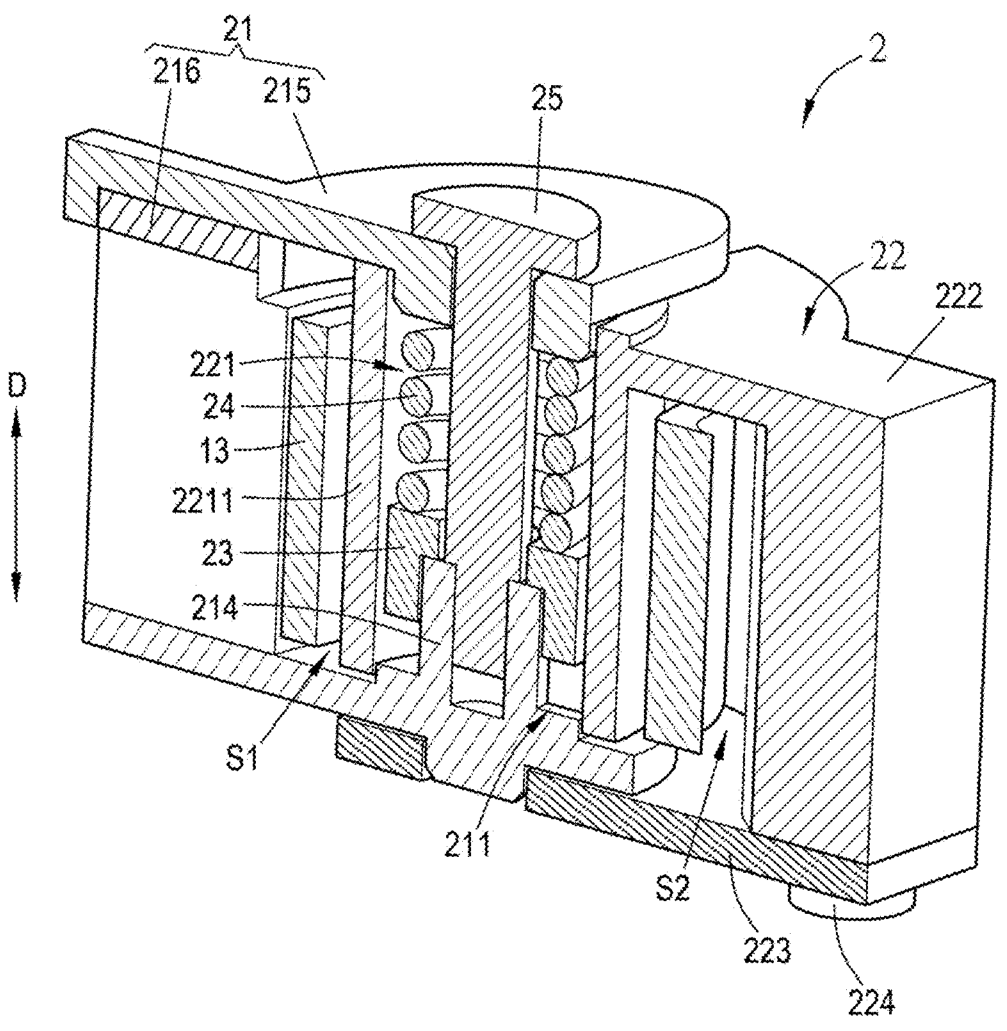
FIG. 3 is a schematic cross-sectional view of the rotating shaft structure in FIG. 2A.
Figure 4A:
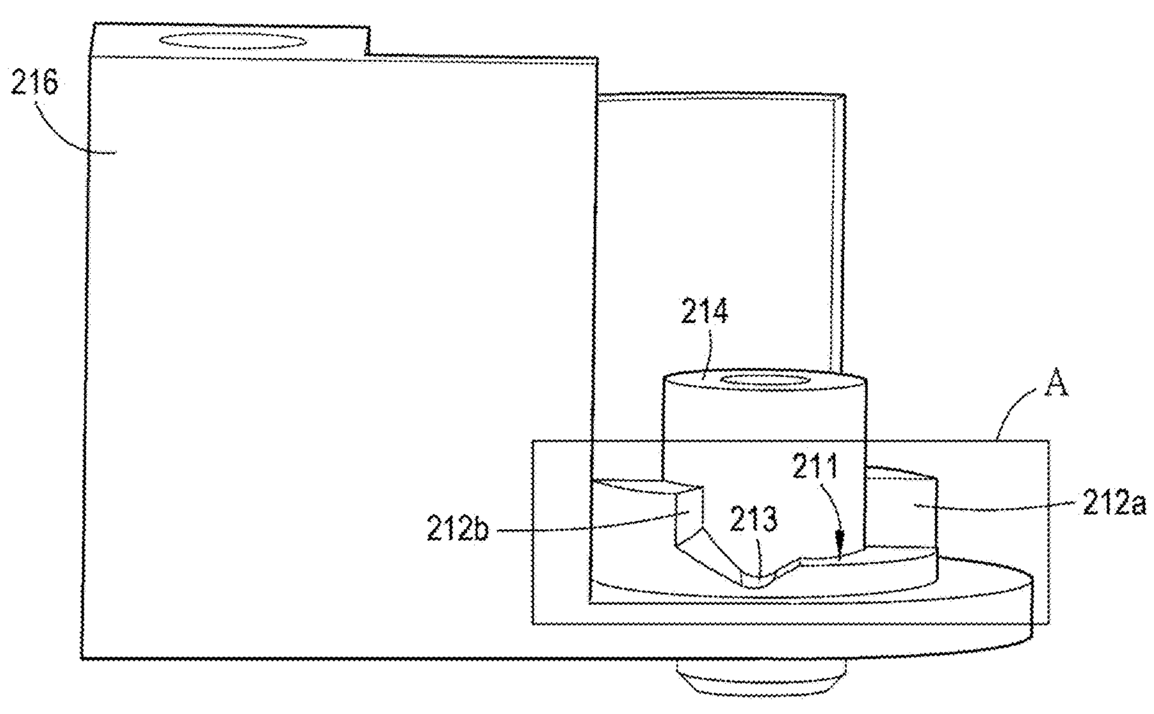
FIG. 4A is a schematic diagram of a base of a first housing of the rotating shaft structure in FIG. 2B from a different perspective.
Figure 4B:
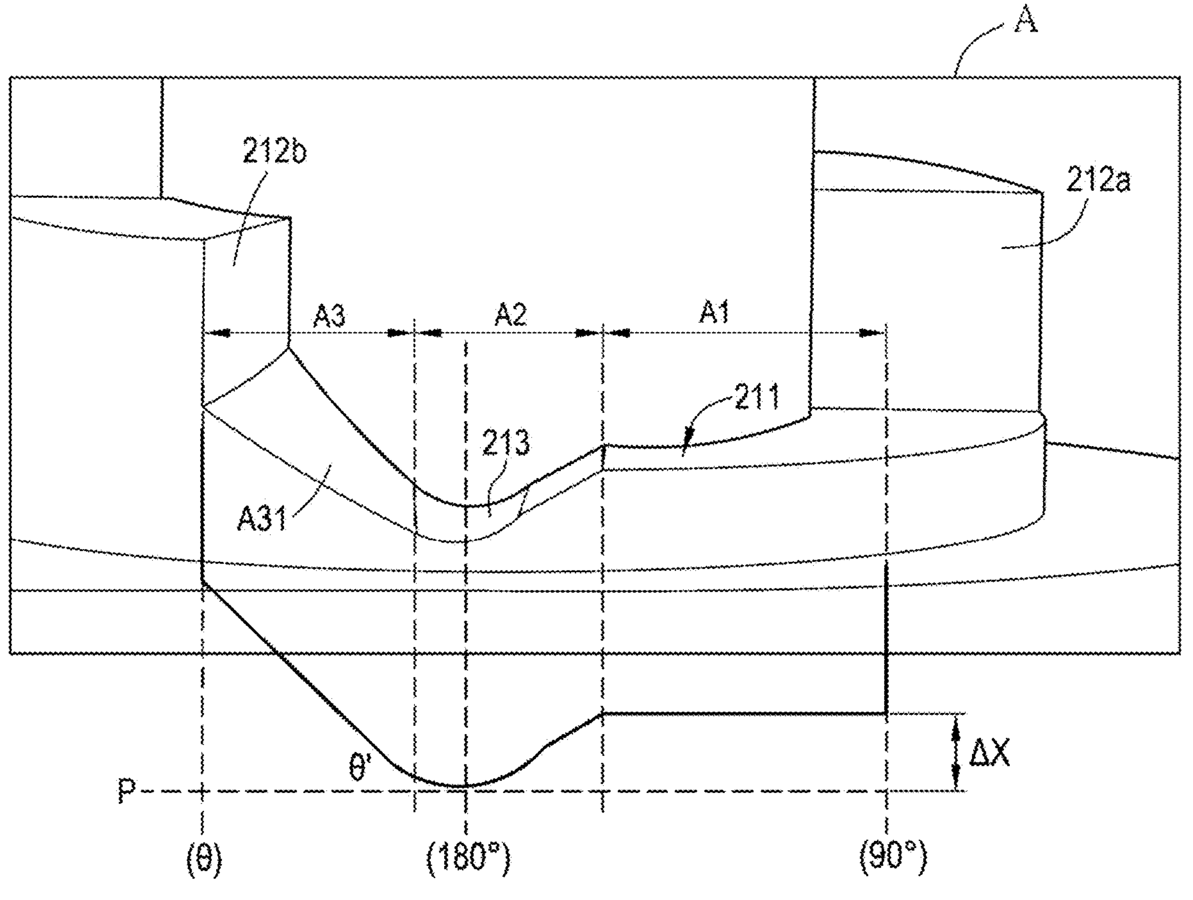
FIG. 4B is a schematic enlarged view of an area in FIG. 4A.

FIG. 1 is a schematic top view of VR or AR glasses 1 according to an embodiment of the present invention. FIG. 2A and FIG. 2B are respectively a three-dimensional schematic diagram and a schematic exploded view of a rotating shaft structure 2 of the glasses 1 in FIG. 1. FIG. 3 is a schematic sectional view of the rotating shaft structure 2 in FIG. 2A. FIG. 4A is a schematic diagram of a base 216 of a first housing 21 of the rotating shaft structure 2 in FIG. 2B from a different perspective. FIG. 4B is a schematic enlarged view of an area A in FIG. 4A.

Referring to FIG. 1 to FIG. 4B, the glasses 1 include a glass frame 11, at least one glass foot 12, and at least one rotating shaft structure 2. The rotating shaft structure 2 is configured to be connected to the glass frame 11 and the glass foot 12 of the glasses 1, and the glass frame 11 and the glass foot 12 are configured to rotate relative to each other through the rotating shaft structure 2. FIG. 1 illustrates the glasses 1 including two glass feet 12 and two rotating shaft structures 2 arranged opposite each other. However, FIG. 2A illustrates the rotating shaft structure 2 of the glasses 1 illustrated in FIG. 1 located on a lower side, for example. The glass frame 11 and the glass foot 12 may rotate relative to each other through the rotating shaft structures 2, to achieve folding of the glass foot 12, unfolding of the glass foot 12, and expanding of the glass foot 12.

The rotating shaft structure 2 includes a first housing 21, a second housing 22, an annular frame 23, an elastic body 24, and a rotating shaft 25. The first housing 21 is connected to the glass frame 11, and the second housing 22 is connected to the glass foot 12, but the present invention is not limited thereto. In a different embodiment, the first housing 21 may be connected to the glass foot 12, and the second housing 22 may be connected to the glass frame 11.

The first housing 21 has a guide groove 211, and the guide groove 211 includes two retaining walls 212*a* and 212*b* and a recess 213 located between the retaining walls 212*a* and 212*b*. In addition, the first housing 21 in this embodiment further has a fixing portion 214 facing the annular frame 23. The guide groove 211 is located on a periphery of the fixing portion 214. In this embodiment, the first housing 21 is formed through connection (fixed connection) of two components, that is, an upper cover 215 and the base 216. In a different embodiment, the first housing 21 may alternatively be a single member that is integrally formed, which is not limited. The guide groove 211 (the retaining walls 212*a* and 212*b* and the recess 213) and the fixing portion 214 are all located at an inner bottom of the base 216.

The second housing 22 is relatively rotatably fitted with and arranged corresponding to the first housing 21, and at least part of the second housing 22 is located within the first housing 21. The second housing 22 in this embodiment is composed of two components, that is, a body 222 and a bottom cover 223, and the body 222 and the bottom cover 223 are fixedly connected together through a fixing member 224 (for example, a screw). In a different embodiment, the second housing 22 may alternatively be a single member that is integrally formed, which is also not limited in the present invention.

The annular frame 23 is rotatably arranged in the first housing 21, and is engaged with the second housing 22. The annular frame 23 has a positioning post 231 extending toward the guide groove 211. The positioning post 231 is arranged corresponding to the guide groove 211 (and the recess 213), and the positioning post 231 can abut against the guide groove 211 and move relative to the guide groove 211. Shapes and sizes of the positioning post 231 and the guide groove 211 (and the recess 213) match each other. The positioning post and the guide groove may move relative to each other. Moreover, the positioning post 231 may move among the retaining wall 212*a*, the recess 213, and the retaining wall 212*b* relative to the guide groove 211. In addition, the annular frame 23 further has an annular body 232. The positioning post 231 is located on a side of the annular body 232.

As shown in FIG. 2B, two guide grooves 211 are arranged in this embodiment, and the guide grooves 211 are respectively located on two opposite sides of the periphery of the fixing portion 214. In addition, two positioning posts 231 are arranged, and the two positioning posts 231 are located on two opposite sides of the annular body 232, and are arranged respectively corresponding to the two guide grooves 211. In this way, the annular frame 23 (the positioning posts 231) can move (rotate) more stably relative to the guide grooves 211.

The elastic body 24 is arranged in the first housing 21 and the second housing 22, and two ends of the elastic body 24 are respectively connected to the first housing 21 and annular frame 23. The elastic body 24 in this embodiment is a spring. An upper side end of the spring is fixedly connected to the upper cover 215 of the first housing 21, and a lower side end of the spring is fixedly connected to the annular body 232 of the annular frame 23. Therefore, when the first housing 21 rotates relative to the second housing 22, since the two ends of the elastic body 24 are limited, the elastic body 24 generates a spring compression force as a result of the rotation of the first housing 21 relative to the second housing 22.

The rotating shaft 25 extends through the first housing 21, the annular frame 23, and the elastic body 24. In this embodiment, the body 222 of the second housing 22 has an accommodation hole 221 located within the first housing 21. The accommodation hole 221 runs through the body 222 in an extending direction D of the rotating shaft 25. The accommodation hole 221 overlaps the first housing 21 in the extending direction D of the rotating shaft 25. The elastic body 24, the annular frame 23, the fixing portion 214, and the guide groove 211 are all located within the accommodation hole 221. The rotating shaft 25 extends through the accommodation hole 221 (the body 222), and the rotating shaft 25 successively extends through the upper cover 215, the elastic body 24, and the annular frame 23, so that one end of the rotating shaft 25 is located on the upper cover 215, and the other end of the rotating shaft 25 is fixed to the fixing portion 214 of the base 216, thereby fixing the elastic body 24 and the annular frame 23 in the accommodation hole 221. Therefore, the first housing 21 and the second housing 22 may rotate relative to each other through the rotating shaft 25, so that the glass frame 11 and the glass foot 12 can rotate relative to each other, to achieve operations of folding, unfolding, and expanding of the glass foot 12. The rotating shaft 25 in this embodiment is, for example, but is not limited to, a screw or a bolt.

In addition, the body 222 of the second housing 22 in this embodiment has a side wall 226. The side wall 226 includes an engagement groove 225 fitted with the positioning post 231. The engagement groove 225 is in communication with the accommodation hole 221. A side surface of the positioning post 231 of the annular frame 23 is engaged with the engagement groove 225 of the body 222. Therefore, when the second housing 22 rotates relative to the first housing 21 (or the first housing 21 rotates relative to the second housing 22), the second housing 22 (the body 222) also drives the positioning post 231 (the annular frame 23) to rotate relative to the first housing 21 through the engagement groove 225. Since two positioning posts 231 are arranged in this embodiment, two engagement grooves 225 are arranged, and are arranged respectively corresponding to the two positioning posts 231.

In addition, the two ends of the elastic body 24 are connected to the upper cover 215 of the first housing 21 and the annular frame 23 (the annular body 232), and the positioning post 231 of the annular frame 23 may move relative to the guide groove 211. Therefore, when the first housing 21 rotates relative to the second housing 22 through the rotating shaft 25, the first housing 21 further rotates relative to the annular frame 23, so that the positioning post 231 moves relative to the guide groove 211, and the positioning post 231 can selectively stop at the retaining walls 212*a* and 212*b* or the recess 213. In other words, when the first housing 21 and the second housing 22 rotate relative to each other, the first housing 21 further rotates relative to the annular frame 23. The positioning post 231 of the annular frame 23 may move relative to the guide groove 211, and the positioning post 231 is stopped by the retaining walls 212*a* and 212*b* or stops (is positioned) at the recess 213, which depends on an angle of the relative rotation between the first housing 21 and the second housing 22. In addition, during the rotation, since the guide groove 211 has a varying height, the annular frame 23 moves in the extending direction D parallel to the rotating shaft 25 (that is, moves up and down) through abutment between the positioning post 231 and the guide groove 211.

Referring to FIG. 3, the glasses 1 in this embodiment may further include a flexible flat cable 13 (or a wire). The glass frame 11 and the glass foot 12 each have an electronic element configured to achieve VR or AR. The flexible flat cable 13 (or the wire) can transmit electric signals of the electronic elements. In addition, in this embodiment, a first accommodation space S1 exists between the base 216 of the first housing 21 and a side wall 2211 of the accommodation hole 221. The body 222 of the second housing 22 further has a second accommodation space S2 in communication with the first accommodation space S1. The flexible flat cable 13 may extend through the first accommodation space S1 and the second accommodation space S2. In this way, not only the flexible flat cable 13 (or the wire) of the glasses 1 is prevented from being exposed and interfering with an action of the rotating shaft structure 2, but also relevant actuating mechanisms of the rotating shaft structure 2 can be prevented from being easily damaged as a result of falling.

Figure 5A:
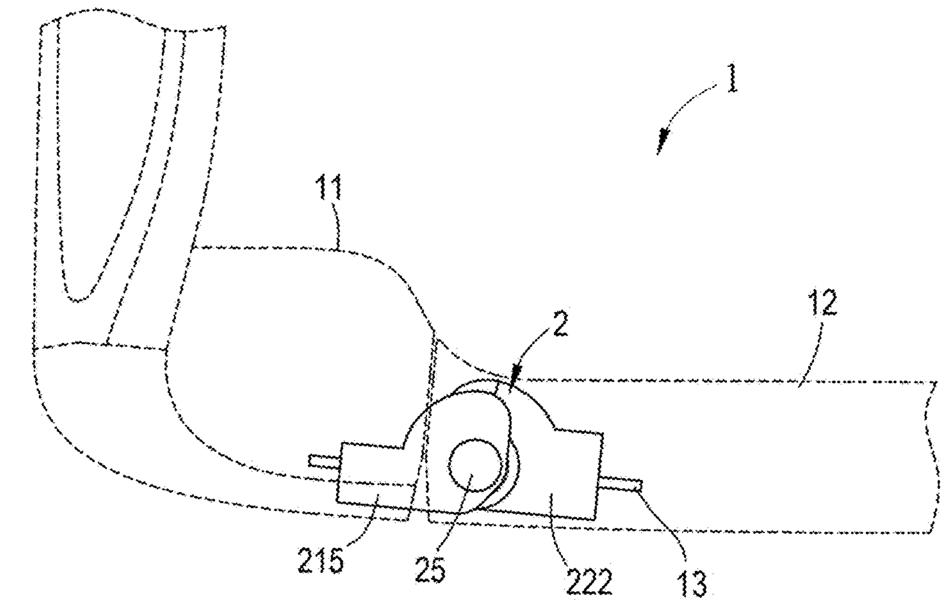
FIG. 5A is a schematic diagram of the glasses at an unfolded position (for normal wearing and use) according to an embodiment of the present invention.
Figure 5B:
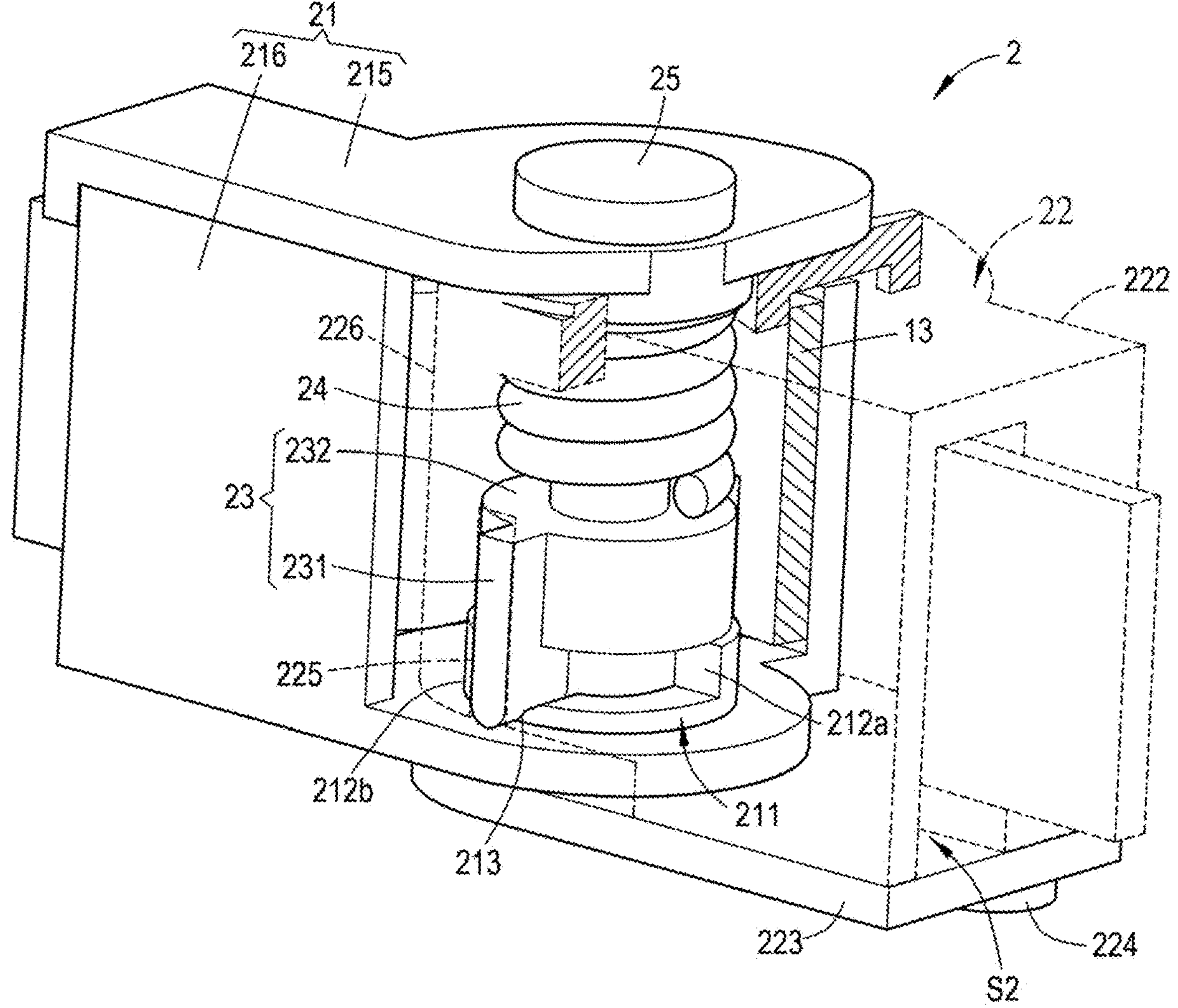
FIG. 5B is a partial three-dimensional perspective view of the rotating shaft structure of the glasses in FIG. 5A.
Figure 6A:
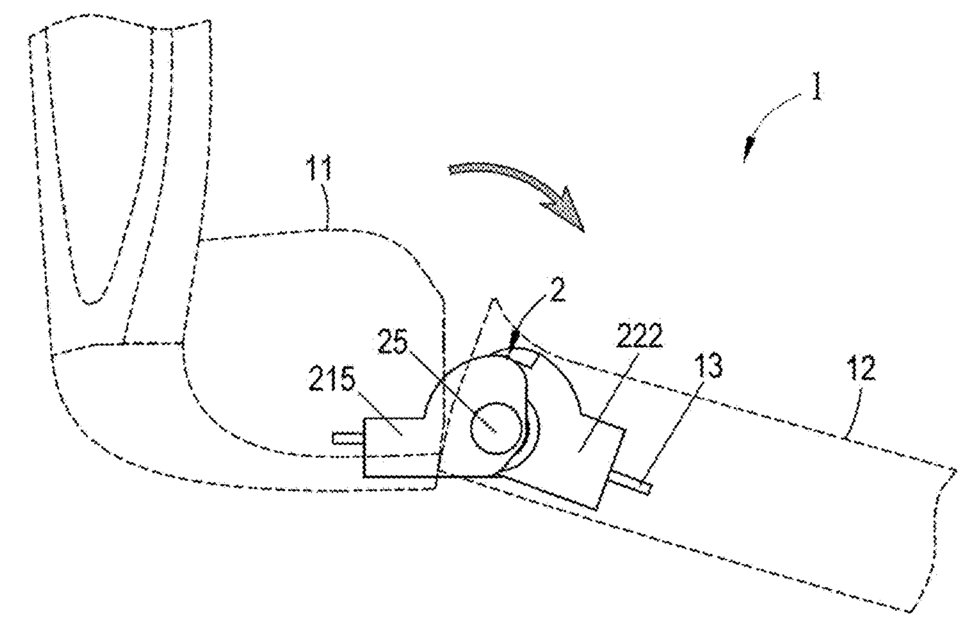
FIG. 6A is a schematic diagram of glasses at an expanded position according to an embodiment of the present invention.
Figure 6B:
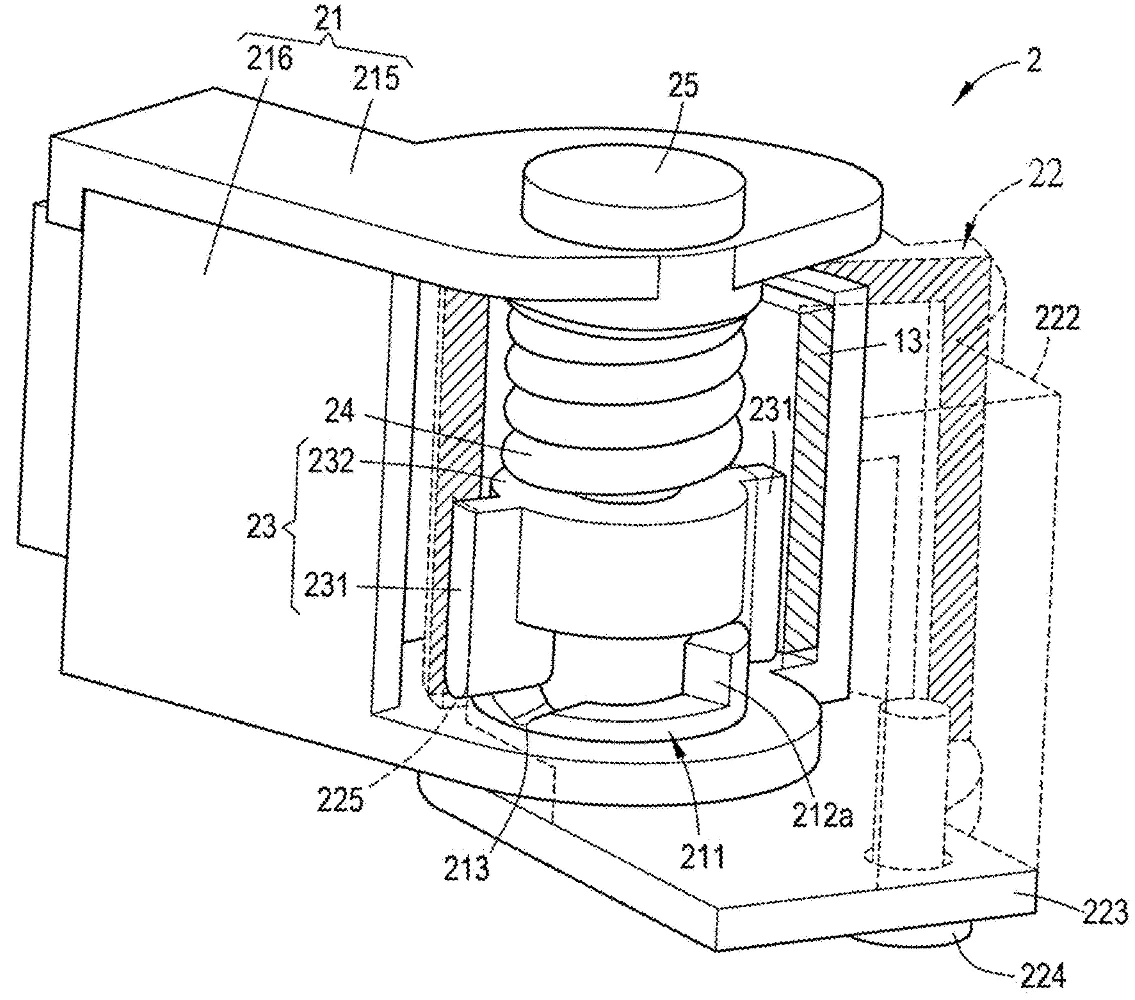
FIG. 6B is a partial three-dimensional perspective view of the rotating shaft structure of the glasses in FIG. 6A.
Figure 7A:
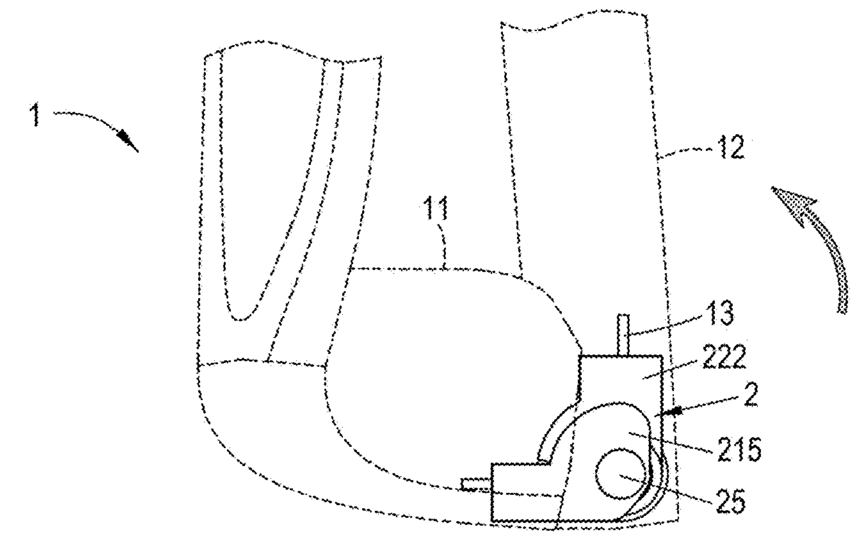
FIG. 7A is a schematic diagram of glasses at a folded position according to an embodiment of the present invention.
Figure 7B:
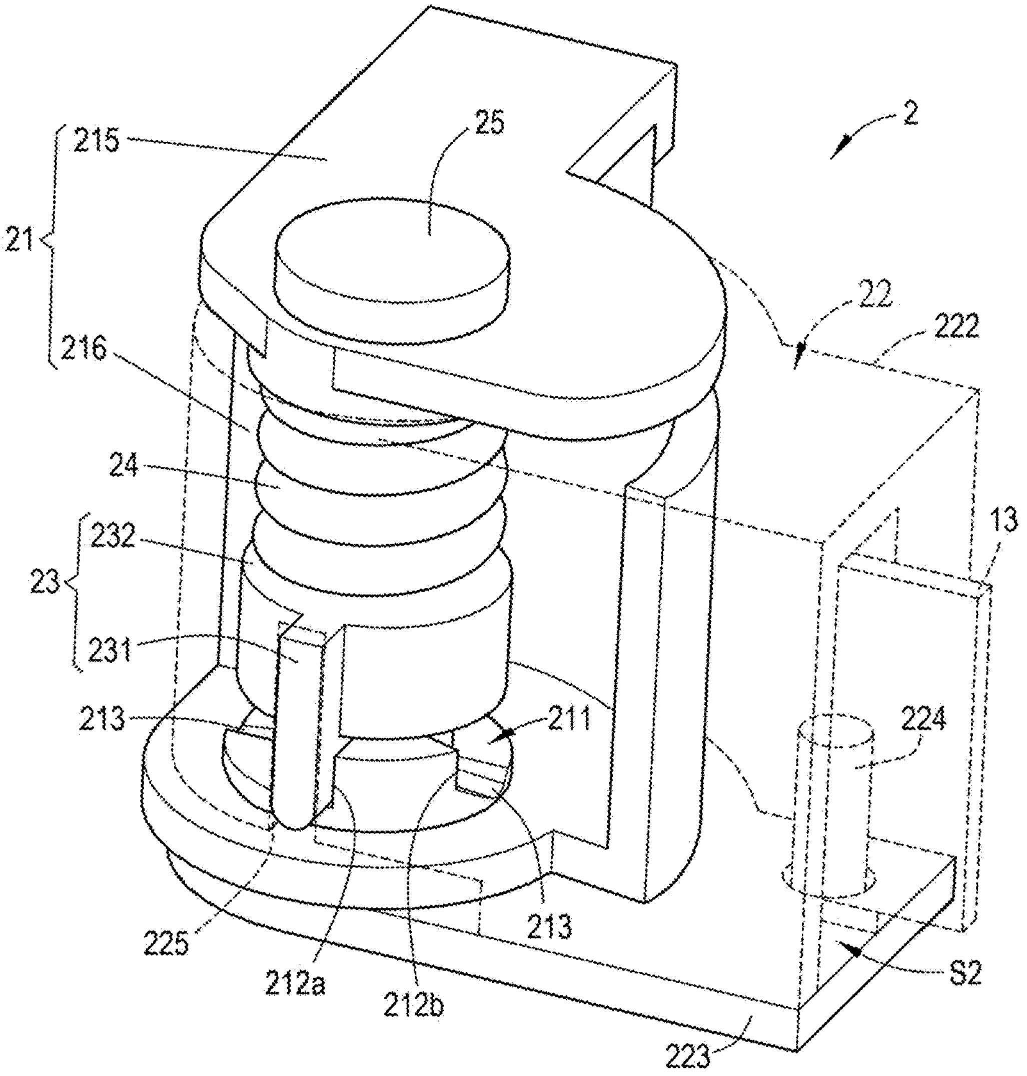
FIG. 7B is a partial three-dimensional perspective view of the rotating shaft structure of the glasses in FIG. 7A.

Referring to FIG. 2B, FIG. 4B, and FIG. 5A to FIG. 7B, action details of the rotating shaft structure 2 during unfolding (for normal wearing and use), folding, and expanding of the glass foot 12 of the glasses 1 in this embodiment are described. FIG. 5A is a schematic diagram of the glasses 1 at an unfolded position (for normal wearing and use) according to an embodiment of the present invention. FIG. 5B is a partial three-dimensional perspective view of the rotating shaft structure 2 of the glasses 1 in FIG. 5A. FIG. 6A is a schematic diagram of the glasses 1 at an expanded position according to an embodiment of the present invention. FIG. 6B is a partial three-dimensional perspective view of the rotating shaft structure 2 of the glasses 1 in FIG. 6A. FIG. 7A is a schematic diagram of the glasses 1 at a folded position according to an embodiment of the present invention. FIG. 7B is a partial three-dimensional perspective view of the rotating shaft structure 2 of the glasses 1 in FIG. 7A.

Referring to FIG. 4B first, the guide groove 211 includes a folding area A1, an unfolding area A2, and an expanding area A3. The unfolding area A2 is located between the folding area A1 and the expanding area A3, to form different angles between the glass frame 11 and the glass foot 12 based on a position on the guide groove 211 at which the positioning post 231 stops. A position of the recess 213 is defined as the unfolding area A2. In addition, the above retaining walls may include a folding retaining wall 212*a*. A space between the folding retaining wall 212*a* and the recess 213 is defined as the folding area A1, and a step ΔX exists between the folding area A1 and the recess 213. The step ΔX is a height difference between an edge of the folding area A1 and a lowest point of the recess 213. Through the step ΔX, a user can feel different damping senses during folding of the glass foot 12, and the glass foot 12 has a free-stop function.

In addition, the above retaining walls may further include an expanding retaining wall 212*b*. A space between the expanding retaining wall 212*b* and the recess 213 is defined as the expanding area A3. The expanding area A3 includes an inclined plane A31. In an embodiment, an included angle θ' exists between the inclined plane A31 and a horizontal plane P, which is, for example, but is not limited to, 45 degrees. Through the design of the expanding area A3, an expanding angle of the glass foot 12 can be increased, so that the glasses can be applied to a relatively large face. The expanding angle may be designed and adjusted based on a size of a human face, which is not limited. In an embodiment, the expanding angle is, for example, but is not limited to, 20 degrees.

Referring to FIG. 2B, FIG. 4B, FIG. 5A, and FIG. 5B again, when the glass foot 12 is opened from the folded position to a normal wearing position (the glass foot 12 is at an opening angle of about 90 degrees), an angle of 180 degrees is formed between the first housing 21 and the second housing 22 (FIG. 4B). During the opening of the glass foot 12, the first housing 21 and the second housing 22 rotate relative to each other. Since the positioning post 231 is engaged with the engagement groove 225 of the body 222, the first housing 21 further rotates relative to the annular frame 23. In this case, the elastic body 24 is compressed and generates a spring compression force, which is uniformly applied to a top of the annular frame 23. In addition, a bottom end of the positioning post 231 of the annular frame 23 and the guide groove 211 abut against each other, and the positioning post may move the unfolding area A2 relative to the guide groove, and may be engaged with (stop at) the recess 213, so that the user can wear the glasses 1 normally. During the rotation, the positioning post 231 of the annular frame 23 is further guided by a feature of the guide groove 211, so that the annular frame 23 moves up and down in the extending direction D parallel to the rotating shaft 25.

In addition, referring to FIG. 2B, FIG. 4B, FIG. 6A, and FIG. 6B again, when the glasses are applied to a relatively large face and therefore the glass foot 12 needs to be expanded, the angle between the first housing 21 and the second housing 22 exceeds 180 degrees (the angle θ in FIG. 4B is, for example, equal to 200 degrees). During the expanding of the glass foot 12, the second housing 22 (the body 222) drives the positioning post 231 of the annular frame 23 to move toward the expanding retaining wall 212*b* from the unfolding area A2 along the inclined plane A31, and finally stop at the expanding retaining wall 212*b*, thereby reaching a maximum expanding angle. When the positioning post 231 of the annular frame 23 moves to the expanding area A3 relative to the guide groove 211 and the user applies no force to the first housing 21 or the second housing 22, the positioning post 231 moves to the unfolding area A2 relative to the guide groove 211 along the inclined plane A31 through an elastic recovery force of the elastic body 24, and stops at the recess 213.

In addition, referring to FIG. 2B, FIG. 4B, FIG. 7A, and FIG. 7B again, when the glass foot 12 is folded from the unfolded position to the folded position, an angle of 90 degrees is formed between the first housing 21 and the second housing 22 (FIG. 4B). During the folding of the glass foot 12, the second housing 22 (the body 222) drives the positioning post 231 of the annular frame 23 to span the step ΔX and move toward the folding retaining wall 212*a* from the recess 213 along the folding area A1, and finally stop at the folding retaining wall 212*a*, thereby arriving at the folded position.

Based on the above, in the glasses 1 in this embodiment, the elastic body 24 generates the spring compression force, the annular frame 23 may move up and down in the extending direction D of the rotating shaft 25, the positioning post 231 corresponding to the guide groove 211 is introduced into the annular frame 23, the positioning post 231 can abut against the guide groove 211 and move relative to the guide groove 211, and when the first housing 21 rotates relative to the second housing 22, the first housing 21 further rotates relative to the annular frame 23, so that the positioning post 231 of the annular frame 23 abuts against the guide groove 211 and moves relative to the guide groove 211 when the annular frame 23 is subjected to the spring compression force of the elastic body 24. Through structural features such as the recess 213, the step ΔX, the inclined plane A31, and the retaining walls 212*a* and 212*b* of the guide groove 211, the rotating shaft structure can enable operations which facilitate wearing and storage of the glasses 1, such as unfolding, expanding, and folding, while making the glasses practical and comfortable. In addition, the glasses 1 in this embodiment are further designed with the accommodation spaces (S1 and S2) that can accommodate the flexible flat cable 13 (or the wire) between the two housing of the rotating shaft structure 2, so that problems that the relevant components such as the flexible flat cable 13 (or the wire) of the glasses 1 are exposed or interfere with the mechanism are avoided, to achieve functions needed during practical use of head-mounted displays.

In summary, in the rotating shaft structure for VR or AR glasses and the glasses of the present invention, the guide groove of the first housing includes the two retaining walls and the recess located between the retaining walls; the annular frame is rotatably arranged in the first housing, is engaged with the second housing, and has the positioning post extending toward the guide groove, and the positioning post can abut against the guide groove and move relative to the guide groove; the two ends of the elastic body are respectively connected to the first housing and the annular frame; the rotating shaft extends through the first housing, the elastic body, and the annular frame; and when the first housing rotates the rotation relative to the second housing through the rotating shaft, the first housing further rotates relative to the annular frame, so that the positioning post moves relative to the guide groove and the positioning post selectively stops at the retaining walls or the recess. Through the above structural design, the rotating shaft structure can enable operations which facilitate wearing and storage of the glasses, such as unfolding, expanding, and folding, while making the glasses practical and comfortable.

In an embodiment of the present invention, the accommodation space that can accommodate the flexible flat cable (or the wire) is further designed between the housings of the rotating shaft structure, so that problems that the relevant components such as the flexible flat cable (or the wire) of the glasses are exposed or interfere with the mechanism are avoided, to achieve functions needed during practical use of head-mounted displays.

The above descriptions are examples but not limitations. Any equivalent modification or change made to the present invention without departing from the spirit and scope thereof are included in the appended claims.

What is claimed is:

1. A rotating shaft structure for virtual reality (VR) or augmented reality (AR) glasses, configured to be connected to a glass frame and a glass foot of the glasses, the rotating shaft structure comprising:

a first housing, having a guide groove, wherein the guide groove comprises two retaining walls and a recess located between the retaining walls;

a second housing, relatively rotatably fitted with the first housing, wherein at least part of the second housing is located within the first housing;

an annular frame, rotatably arranged in the first housing and engaged with the second housing, wherein the annular frame has a positioning post extending toward the guide groove, the positioning post is arranged corresponding to the guide groove, and the positioning post is configured to abut against the guide groove and move relative to the guide groove;

an elastic body, arranged in the first housing and the second housing, wherein two ends of the elastic body are respectively connected to the first housing and the annular frame; and a rotating shaft, extending through the first housing, the elastic body, and the annular frame, wherein when the first housing rotates relative to the second housing through the rotating shaft, the first housing further rotates relative to the annular frame, so that the positioning post moves relative to the guide groove and the positioning post selectively stops at the retaining walls or the recess.

2. The rotating shaft structure according to claim 1, wherein the second housing has an accommodation hole located within the first housing and overlapping the first housing in an extending direction of the rotating shaft, and the elastic body, the annular frame, and the guide groove are located within the accommodation hole.

3. The rotating shaft structure according to claim 2, wherein the first housing further has a fixing portion facing the annular frame, and the guide groove is located on a periphery of the fixing portion.

4. The rotating shaft structure according to claim 3, wherein the rotating shaft extends through the accommodation hole, and an end of the rotating shaft is fixed to the fixing portion.

5. The rotating shaft structure according to claim 3, wherein two guide grooves are arranged, and the guide grooves are respectively located on two opposite sides of the periphery of the fixing portion.

6. The rotating shaft structure according to claim 5, wherein the annular frame further has an annular body, two positioning posts are arranged, and the positioning posts are respectively located on two opposite sides of the annular body and arranged corresponding to the guide grooves.

7. The rotating shaft structure according to claim 2, wherein the second housing has a side wall, the side wall comprises an engagement groove fitted with the positioning post, the engagement groove is in communication with the accommodation hole, and a side surface of the positioning post is engaged with the engagement groove.

8. The rotating shaft structure according to claim 2, wherein a first accommodation space exists between the first housing and a side wall of the accommodation hole, the second housing further has a second accommodation space in communication with the first accommodation space, and the first accommodation space and the second accommodation space are configured for a flexible flat cable of the glasses to extend through.

9. The rotating shaft structure according to claim 1, wherein when the first housing and the second housing rotate relative to each other, the annular frame moves in an extending direction parallel to the rotating shaft through the positioning post and the guide groove.

10. The rotating shaft structure according to claim 1, wherein the guide groove comprises a folding area, an unfolding area, and an expanding area, and the unfolding area is located between the folding area and the expanding area, to form different angles between the glass frame and the glass foot based on a position on the guide groove at which the positioning post stops.

11. The rotating shaft structure according to claim 10, wherein when the positioning post moves to the unfolding area relative to the guide groove, the positioning post is engaged with the recess.

12. The rotating shaft structure according to claim 10, wherein the retaining walls comprise a folding retaining wall, a space between the folding retaining wall and the recess is defined as the folding area, and a step exists between the folding area and the recess.

13. The rotating shaft structure according to claim 10, wherein the retaining walls comprise an expanding retaining wall, a space between the expanding retaining wall and the recess is defined as the expanding area, and the expanding area comprises an inclined plane.

14. The rotating shaft structure according to claim 13, wherein when the positioning post moves to the expanding area relative to the guide groove and applies no force to the first housing or the second housing, the positioning post of the annular frame moves to the unfolding area through the elastic body relative to the guide groove along the inclined plane.

15. A VR or AR glasses, comprising:

a glass frame;

at least one glass foot; and the rotating shaft structure according to claim 1, wherein the rotating shaft structure is arranged between the glass frame and the glass foot, and the glass frame and the glass foot are configured to rotate relative to each other through the rotating shaft structure.

16. The glasses according to claim 15, wherein the first housing of the rotating shaft structure is connected to the glass frame, and the second housing of the rotating shaft structure is connected to the glass foot.

17. The glasses according to claim 15, wherein the first housing of the rotating shaft structure is connected to the glass foot, and the second housing of the rotating shaft structure is connected to the glass frame.

* * * * *